C. W. ZIMMER.
COMBINED INCUBATOR AND BROODER.
APPLICATION FILED DEC. 14, 1911.
1,025,181.
Patented May 7, 1912.
3 SHEETS—SHEET 1.
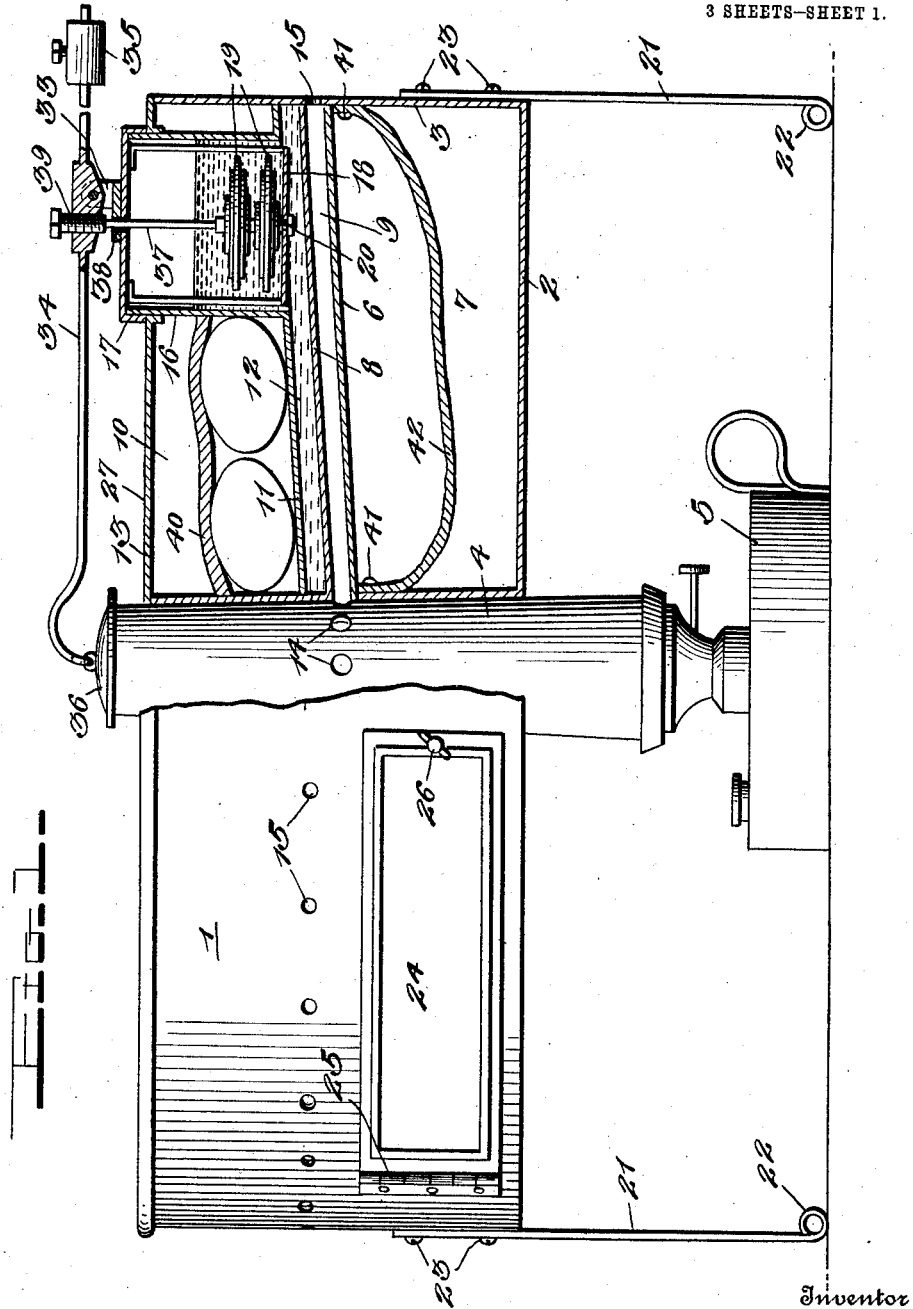
Witnesses
Chas. L. Griestauer.
G. B. Norton.
Inventor
Cyrus W. Zimmer,
By Watson E. Coleman,
Attorney

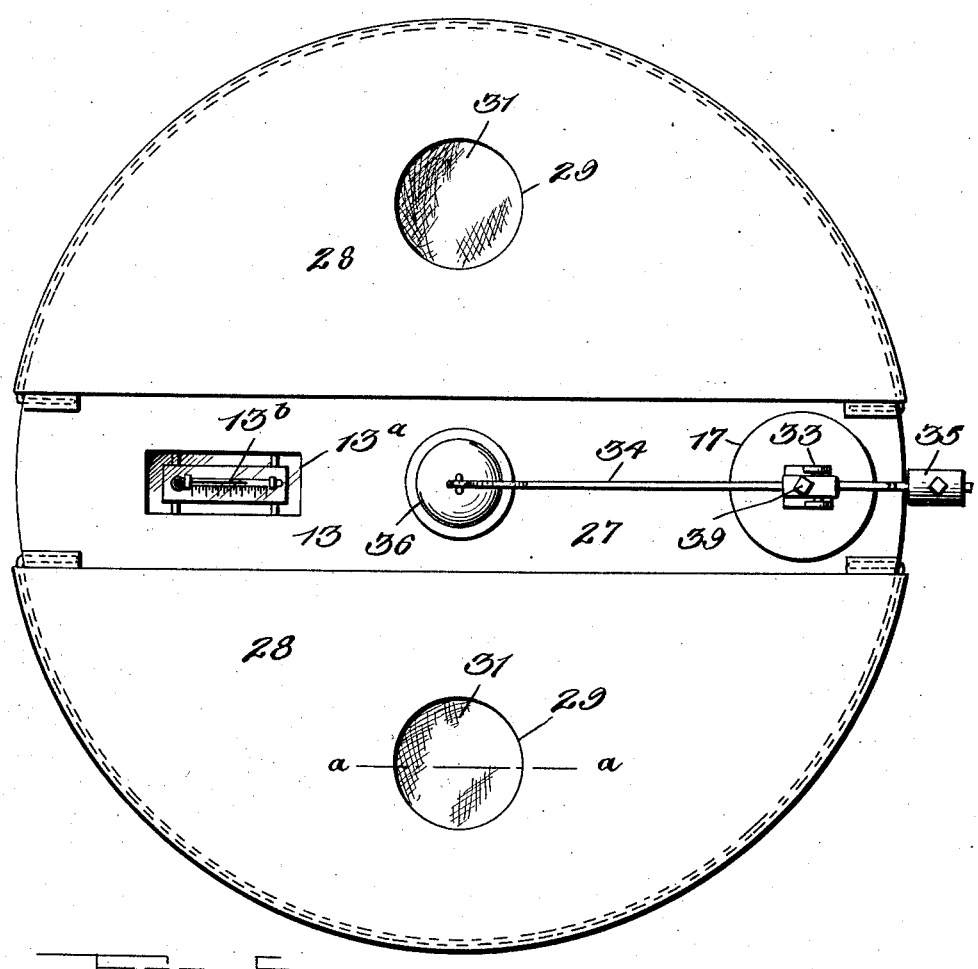

C. W. ZIMMER.
COMBINED INCUBATOR AND BROODER.
APPLICATION FILED DEC. 14, 1911.
1,025,181.
Patented May 7, 1912.
3 SHEETS—SHEET 3.
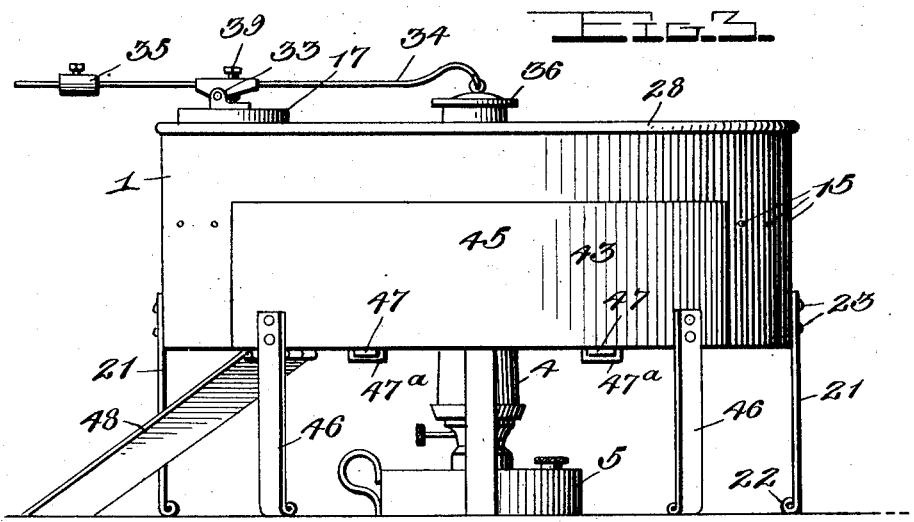
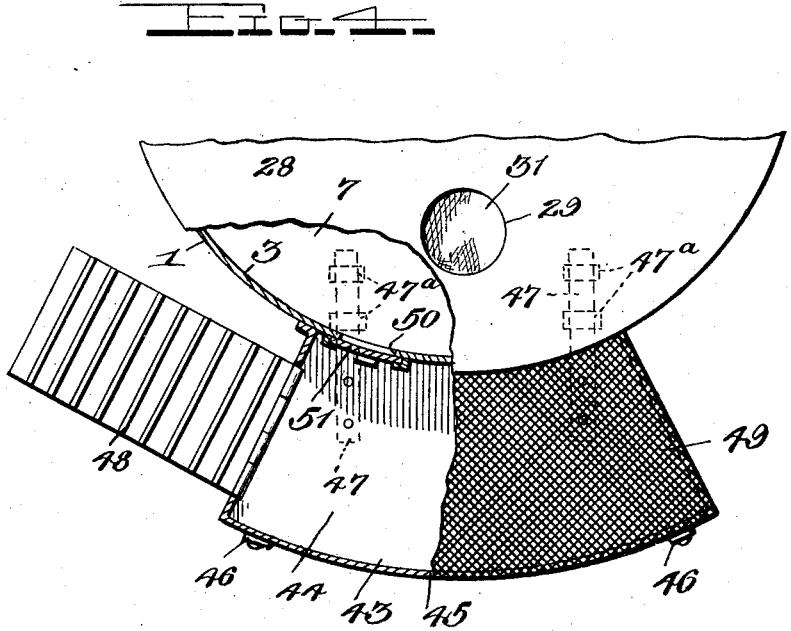
Witnesses
Chas. L. Griesbauer.
G. B. Norton.
Inventor
Cyrus W. Zimmer,
By Watson E. Coleman,
Attorney

UNITED STATES PATENT OFFICE.

CYRUS W. ZIMMER, OF NEW YORK, N. Y.

COMBINED INCUBATOR AND BROODER.

1,025,181. Specification of Letters Patent. Patented May 7, 1912.

Application filed December 14, 1911. Serial No. 665,652.

*To all whom it may concern:*

Be it known that I, CYRUS W. ZIMMER, a citizen of the United States, residing at New York, in the county of New York and State of New York, have invented certain new and useful Improvements in Combined Incubators and Brooders, of which the following is a specification, reference being had to the accompanying drawings.

This invention is an improved combined incubator and brooder and consists in the construction, combination and arrangement of devices hereinafter described and claimed.

One object of my invention is to provide an improved machine of this character which is extremely cheap and simple, is compact, is fireproof, may be readily operated and managed and requires very little attention.

Another object is to effect improvements in the construction of the incubating chamber and the heating apparatus whereby contact heat is provided for the eggs in the incubating chamber.

A further object is to effect improvements in the construction of the machine whereby a hot water heating tank having a maximum heating surface is provided.

Another object is to effect improvements in the construction of the machine whereby the incubating chamber is automatically ventilated.

Another object is to effect improvements in the construction of the incubating chamber and in the arrangement of the egg covering blankets therein whereby natural egg moisture is confined close down to the eggs in the incubating chamber, and any suitable number of covering blankets may be used, to enable the operator to control the temperature of the air surrounding the eggs, thus retaining the heat and enabling the temperature at the point of contact to be lowered and still maintain the temperature of the eggs at the proper degree of incubation.

Another object is to effect improvements in the construction of the body of the machine whereby the same is provided with a brooder, a hot air heating chamber immediately above the brooder, a hot water heating chamber immediately above the hot air heating chamber and an incubating chamber, the bottom of which is formed by the hot water heating chamber.

Another object is to effect improvements in the construction of the body of the incubator and of the heating apparatus therefor whereby the fumes of the lamp are utilized for heating the water which heats the incubating chamber and also the brooder, are prevented from entering the incubating chamber.

In the accompanying drawings: Figure 1 is a side elevation of a combined incubator and brooder constructed in accordance with my invention, the same being shown partly in section. Fig. 2 is a top plan view of the device. Fig. 3 is a side elevation on a reduced scale. Fig. 4 is a fragmentary top plan view with parts broken away and other parts in section, and, Fig. 5 is a detail sectional view on the line *a—a*, of Fig. 2.

The body 1 of my improved combined incubator and brooder is here shown as and is preferably cylindrical in form and comprises a sheet metal bottom 2 and a sheet metal side wall 3. A heating flue 4 from a suitable lamp 5 extends centrally through and is disposed vertically in the body of the incubator. At a suitable distance above the bottom 2 is a sheet metal diaphragm 6 which is of slight inverted conical form. The upper edge of this diaphragm is secured to the wall 3. A brooder chamber 7 is thus formed in the lower portion of the body 1. At a slight distance above the diaphragm 6 is a similar diaphragm 8 which is also secured, at its outer edge, to the wall 3. A hot air heating chamber 9 is thus formed, above the brooding chamber and between the diaphragms 6 and 8. An incubating chamber 10 is formed in the top of the body 1, its bottom being formed by a diaphragm 11 which is similar to the diaphragms 6 and 8 and is spaced above the latter, whereby a hot water heating chamber 12 is formed between the diaphragms 8 and 11. It will be understood that the bottom 11 of the incubating chamber inclines downwardly toward the center of the said chamber and it will also be noted that the heating flue 4 extends through the diaphragms 6, 8 and 11 at the centers thereof and also extends through and projects above the movable cover 13 of the incubating chamber. Hence the fumes from the lamp may be carried away from the heating chamber when not needed in the heating chamber. The flue 4 is provided with openings 14 which communicate with the space 9 between the diaphragms 6 and 8, so that hot air and products of combustion can pass directly from the flue 4 into the hot air heating space or chamber 9 and the wall 3 of the body 1 is provided with outlet openings 15 for the said hot air heating chamber or space so that a circulation of heated air and products of combustion is maintained from the flue 4 outwardly and upwardly through the hot air heating space or chamber 9 and the temperature is equalized in all portions of the chamber. In one side of the incubating chamber is a cylindrical stand 16 open at its upper and lower ends and the lower end of which is in direct communication with the hot water heating chamber 12. A cap 17 is placed on and is removable from the stand and is provided with a transversely disposed supporting bar 18 on which thermostatic wafers 19 are secured, as at 20. Hence, the thermostatic wafers are submerged in the body of water maintained and heated in the hot water heating chamber 12. It will be noted that this hot water heating chamber is around the flue 4 so that the water at the center of the chamber is in direct contact with the said flue and, hence, is heated effectually thereby as well as by the passage of the heated air under the bottom of the said hot water heating chamber and through the hot air heating chamber 9.

A suitable number of supporting legs 21 are provided. These supporting legs are preferably made of sheet metal, have curved lower ends 22 and their upper portions are secured on the outer side of the lower portion of the body 1 as by means of bolts 23. The brooding chamber is provided with suitable doors 24, hinged, as at 25, and which have suitable fastening devices 26. The cover 13 comprises a central section 27 which extends across the top of the machine and a pair of side sections or lids 28, each of which is made of sheet metal, such as tin. Each side section has an opening 29 and the metal around the openings is bent downwardly and flared to form flanges 30. Cloth covers 31 for the openings have their edges bent around the flanges 30 and detachably held in place by open spring rings 31. Hence the cloth covers may be removed and cleansed or renewed when desired and two or more of such covers may be used for each opening if desired or rendered necessary by varying conditions of the outside temperature of the room in which the incubator is operated. The central section of the cover may have a glazed opening 13$^a$ and a thermometer 13$^b$ under said opening and readable therethrough, without opening the incubator. The casing 17 is provided at its upper end, on opposite sides, with a pair of outstanding ears 33, between which a lever 34 is pivotally mounted. The said lever is provided with an adjustable weight 35, near its outer end, and to its inner end is pivotally connected a damper 36 which operates at the upper end of the flue 4. The thermostatic wafers 19 actuate a pin 37 which is slidable in a support 38 with which the casing 17 is provided and the upper end of this pin is engaged by an adjusting screw 39 which is carried by the weighted damper lever 34. Owing to the inverted conical shape of the diaphragms 8 and 11, between which the hot water heating chamber 12 is formed, the lowest point of the said hot water heating chamber is at the center and around the flue 4. This construction insures a circulation of water in the hot water heating chamber and an even temperature throughout the same, because as the water is heated in the central portion of the said chamber it rises to the top and flows to the highest point and then gradually works back to the bottom and inwardly along the bottom to the center of the said chamber. A thermometer may be placed in the body of water in the stand or casing in which the thermostatic wafers are located so that the exact temperature of the water which is heating the eggs in the incubating chamber may be ascertained. A thermometer may also be placed in the incubating chamber under the covering of the eggs to enable the exact temperature of the eggs in the incubating chamber to be ascertained. Owing to the provision of the thermostatic wafers submerged in the water in the hot water heating device and the damper 36 which is automatically operated by the thermostatic wafers, the flue 4 is automatically controlled and the heating of the hot water heating chamber 9 and the hot water heating chamber 12 is kept, automatically, at an even temperature.

The brooding chamber 7 is heated by radiation from the diaphragm 6, downwardly, thus closely imitating the natural conditions. The eggs in the incubating chamber are placed directly on the bottom thereof, which forms the upper side of the hot water heating chamber 12, and, hence, direct contact is provided between the eggs and the heating surface. The eggs are covered by one or a suitable number of disks 40, which may be made of cotton flannel or any other suitable material. The operator may, at his option, place a suitable thickness of sand or earth on the bottom of the incubating chamber for the eggs to lie upon and thus secure a further control and equalization of the heat from the hot water heating chamber and closely approach natural conditions. Sand or earth may be also placed on the bottom of the brooder and moistened from time to time to prevent the air in the brooder from becoming too dry and also to facilitate cleaning. Under certain conditions, as where the incubator is operated where the air is extremely rarefied, moisture may also be added to the sand in the bottom of the incubator chamber to furnish the hatching embryos with sufficient moisture to enable them to successfully develop into strong healthy chicks by the twenty-first day.

It will be observed that there is no forced circulation of air in the incubating chamber. The blanket 40 allows the gases to escape from the eggs and yet serves to retain the natural egg moisture next to the eggs. The construction of my improved incubator is such that the operator has a wide control over the necessary conditions for successful incubation in that he can vary the number of cover blankets over the eggs in the incubating chamber as may be required to retain the necessary heat and moisture in the incubating chamber under varying conditions, as to locality, altitude, heat and cold, and the season of the year.

In the brooding chamber are supports 41 for a hover blanket 42, which may be made of any suitable cloth material and placed so that when the chicks are in the brooder this warm hover blanket rests directly on their backs, even when they lie down on the floor to sleep.

I also provide a runway or exercise gallery 43 for the chicks. This is placed on one side of the incubator and brooder with its floor 44 level with that of the brooder chamber. This gallery also has an outer wall 45. It has no inner wall as this is formed by the side of the brooder chamber against which the gallery is placed. At the outer side of the gallery are supporting legs 46. Supporting arms 47 project from the inner side of the bottom of the gallery, extend under the bottom 2 of the brooder chamber and are detachably fitted in keepers 47. Hence the gallery may be detached at will. A sloping runway 48 is at one end of the gallery to give greater freedom to the chicks, when they are old enough and permit them to go to and from the floor. A cover 49 of wire netting is also provided for the gallery to prevent the chicks, when old enough, from flying over and out. This gallery may be reached by the chicks, through one or more openings 50 of suitable size and shape, in the wall of the brooder next the gallery. Suitable slides 51 are provided for covering or uncovering the said openings. The gallery permits the chicks to go in and out, for exercise and for food and water, and yet confines them near the brooder where they can always receive sufficient warmth.

Having thus described my invention I claim:

1. A combined brooder and incubator, comprising a body having a brooder chamber, an incubator chamber above the brooder chamber, said incubator chamber having a double bottom forming a hot water heating space in the bottom thereof, the brooder chamber being provided with a diaphragm spaced from the lower side of the hot water heating chamber and co-acting therewith to form a hot air heating chamber, and means for heating said chambers.

2. A combined brooder and incubator comprising a body having a brooder chamber, an incubator chamber above the brooder chamber, said incubator chamber having a double bottom forming a hot water heating space in the bottom thereof, the said brooding chamber being provided with a diaphragm spaced from the lower side of the hot water heating chamber and co-acting therewith to form a hot air heating chamber, and a heating flue extending through the brooder chamber, the hot air heating chamber, the hot water heating chamber and the incubating chamber, and having openings discharging directly into the hot air heating chamber.

3. A combined incubator and brooder comprising a body having a brooder chamber, an incubator chamber above the brooder chamber, said incubator chamber having a double bottom forming a hot water heating space in the bottom thereof, the said brooding chamber being provided with a diaphragm spaced from the lower side of the hot water heating chamber and co-acting therewith to form a hot air heating chamber, and a heating flue extending through the brooder chamber, the hot air heating chamber, the hot water heating chamber and the incubating chamber, and having openings discharging directly into the hot air heating chamber, the said body being provided with openings at its outer side communicating with and forming vents for the said hot air heating chamber.

4. A combined incubator and brooder comprising a body having a brooder chamber, an incubator chamber above the brooder chamber, said incubating chamber having a double bottom forming a hot water heating space in the bottom thereof, the said brooding chamber being provided with a diaphragm spaced from the lower side of the hot water heating chamber and co-acting therewith to form a hot air heating chamber, and a heating flue extending through the brooder chamber, the hot air heating chamber, the hot water heating chamber and the incubating chamber, the said flue being disposed in the center of and extending through the body and the double bottom of the incubating chamber and the said diaphragm inclined inwardly and downwardly from the outer wall of the body to the said flue.

5. A combined brooder and incubator, including a body formed with a central vertically disposed flue opening and embodying a brooder chamber, an incubating chamber above the brooder chamber, an annular hot water chamber at the bottom of the incubating chamber, the walls of said hot water heating chamber sloping inwardly and downwardly toward the flue opening, an annular diaphragm spaced from the bottom wall of the hot water heating chamber and constituting an annular hot air heating chamber, the body being formed with openings in its outer wall registering with the outer side of the hot air heating chamber, and a heating flue extending in the flue-receiving opening through all of said chambers and formed with openings in registry with the inner side of the hot air heating chamber.

In testimony whereof I hereunto affix my signature in the presence of two witnesses.

CYRUS W. ZIMMER.

Witnesses:
HERBERT D. COHEN,
JEREMIAH C. CROWLEY.

Copies of this patent may be obtained for five cents each, by addressing the "Commissioner of Patents, Washington, D. C."